(12) United States Patent
Kruecken et al.

(10) Patent No.: US 12,436,556 B2
(45) Date of Patent: Oct. 7, 2025

(54) COMMUNICATION PROTOCOL FOR DIE TO DIE INTERFACE

(71) Applicant: NXP B.V., Eindhoven (NL)

(72) Inventors: Joachim Josef Maria Kruecken, Munich (DE); Andreas Laudenbach, Haag (DE)

(73) Assignee: NXP B.V., Eindhoven (NL)

( * ) Notice: Subject to any disclaimer, the term of this patent is extended or adjusted under 35 U.S.C. 154(b) by 256 days.

(21) Appl. No.: 18/468,263

(22) Filed: Sep. 15, 2023

(65) Prior Publication Data

US 2025/0093899 A1  Mar. 20, 2025

(51) Int. Cl.
  *G05F 3/08* (2006.01)
  *H03K 3/037* (2006.01)
  *H03K 5/24* (2006.01)

(52) U.S. Cl.
  CPC ............ *G05F 3/08* (2013.01); *H03K 3/037* (2013.01); *H03K 5/24* (2013.01)

(58) Field of Classification Search
  CPC ....... H03K 19/018521; H03K 19/0013; H03K 19/0175; H03K 3/35613; H03K 5/08; H03K 5/082; H03K 5/086; H03K 5/1565; H03K 19/00361; H03K 19/0185; H03K 19/018528; H03K 3/037; H03K 3/356113; H03K 5/24; H03K 5/249; G11C 7/1084; G11C 7/1078; G11C 7/22; G11C 7/225; G11C 15/00; G11C 2029/5002; G11C 2211/5647; G11C 29/02; G11C 29/021; G11C 29/028; G11C 5/147; G11C 7/1006; G11C 7/1096; G11C 7/14; G11C 7/20; G11C 7/24; G11C 8/10; G01R 31/31924; G01R 31/3193; G01R 19/16519; G01R 19/16595
  See application file for complete search history.

(56) References Cited

U.S. PATENT DOCUMENTS 10,425,260 B2 * 9/2019 Hollis ................. H04L 25/4917
12,021,668 B2 * 6/2024 Kim ................... H04L 25/03057

OTHER PUBLICATIONS

Richter, et al.: "Low Power Fast Ethernet Line Driver," IEEE, Authorized licensed use limited to: NXP Semiconductors. Downloaded on Mar. 20, 2023 at 08:59:41 UTC from IEEE Xplore, pp. 52-55.

(Continued)

*Primary Examiner* — Lincoln D Donovan
*Assistant Examiner* — Tyler J Pereny
(74) *Attorney, Agent, or Firm* — Joanna G. Geld (57) ABSTRACT

A receiver circuit receives an input voltage waveform from a single wire and generates an output bit stream. The receiver includes a voltage determination circuit which indicates whether a voltage level of the input voltage waveform has one of a high level that is higher than a high voltage threshold, a low level that is lower than a low voltage threshold, or a mid level that is between the high and low voltage levels. The receiver includes a bit value generator which provides a next bit value of the output bit stream as a first value when the voltage level is the high level, as a second value when the voltage level is the low level, and as a same value as an immediately previous bit value of the output bit stream when the voltage level is the mid level. The first and second values correspond to opposite logic states.

20 Claims, 6 Drawing Sheets

(56) References Cited

OTHER PUBLICATIONS

Wikipedia: "Run-length limited," webpage: https://en.wikipedia.org/wiki/Run-length_limited, pp. 1-10.
Wikipedia: MLT-3-Code, webpage: https://de.wikipedia.org/wiki/MLT-3-Code, edited Jul. 27, 2023, pp. 1-3.

* cited by examiner

FIG. 1

| ROW NUMBER | $S_{-1}$ | $L_{-1}$ | S | L | HC | LC |
|---|---|---|---|---|---|---|
| 1 | 0 | L | 0 | M | 0 = 0 | 1→0 |
| 2 | 0 | L | 1 | H | 0→1 | 1→0 |
| 3 | 0 | M | 0 | L | 0 = 0 | 0→1 |
| 4 | 0 | M | 1 | H | 0→1 | 0 = 0 |
| 5 | 1 | H | 0 | L | 1→0 | 0→1 |
| 6 | 1 | H | 1 | M | 1→1 | 0 = 0 |
| 7 | 1 | M | 0 | L | 0 = 0 | 0→1 |
| 8 | 1 | M | 1 | H | 0→1 | 0 = 0 |

COMMUNICATION PROTOCOL FOR DIE TO DIE INTERFACE

BACKGROUND

Field

This disclosure relates generally to die to die interfaces, and more specifically, to a communication protocol for a die to die interface.

Related Art

As semiconductor processing technology advances, devices are becoming increasingly smaller, operating at low voltages (e.g., voltages at 1.8V or lower). This makes it increasingly difficult and expensive to interface to the external world requiring high voltages (e.g., voltages at 3.3V or greater), such as analog circuits. To address this issue, a dual die concept may be implementing in which one die includes high voltage circuits while the other die includes low voltage circuits. However, typical interfaces are overly complex, requiring multiple lines and a precision time base (e.g. clock). Therefore, a need exists for an improved die to die interface.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a communication protocol for die to die interface is implemented with a single wire, in which the single wire provides a data value and an information valid indicator. The single wire protocol is implemented without using a separate wire for transferring any clock information. Instead, three voltage levels (e.g. ranges) are used to transmit bits on the single wire, in which transitions between the three voltage ranges carries timing and valid information. In one embodiment, comparators are used to indicate whether or not an input voltage level is less than a low voltage threshold (Vrl) and whether or not an input voltage is greater than a high voltage threshold (Vrh), in which Vrh>Vrl. In the case that the input voltage is less than Vrh, the corresponding state of the bit a first logic level (e.g. 0), and in the case it is greater than Vrh, the corresponding state of the bit is a second logic level (e.g. 1), opposite the first logic level. However, if the input voltage is between Vrh and Vrl (neither greater than Vrh nor less than Vrl), the corresponding state of the bit depends on the state of the previous bit. Transitions of the outputs of the comparators indicate timing and valid bit information because there is a voltage level transition for every bit. Immediately successive bits which have the same voltage level indicate a violation of the protocol. In one embodiment, additional functionality is added to the protocol by mapping one or more additional actions or additional information to a detected violation.

Figure 1:
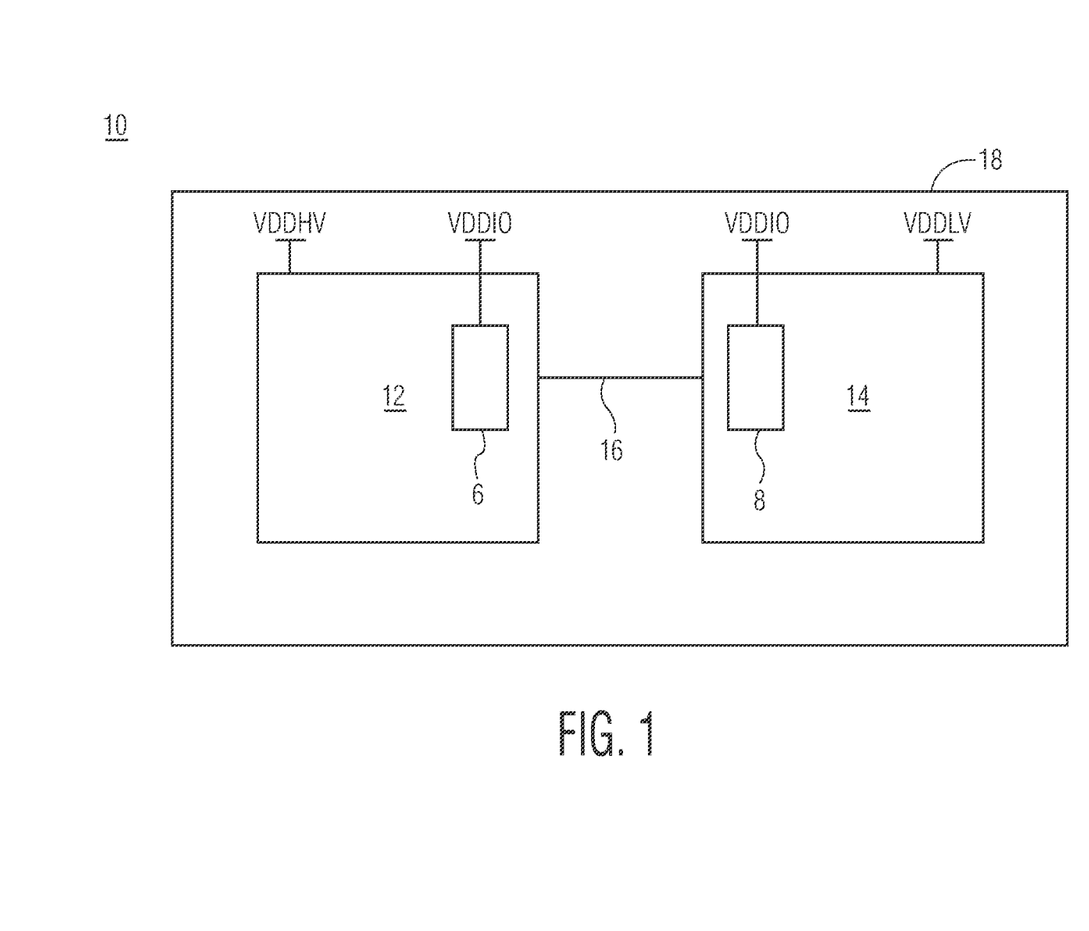
FIG. 1 illustrates, in block diagram a dual die system with a single wire interface between the die, in accordance with one embodiment of the present invention.

FIG. 1 illustrates, in block diagram form, a dual die system 10 having a first die 12 and a second die 14, coupled to each other via a single wire 16, in accordance with one embodiment of the present invention. Die 12 includes interface circuitry 6 and die 14 includes interface circuitry 8, in which the interface circuitry of either die may include both transmitter circuitry for transmitting a voltage wave encoded with information via single wire 16 and receiver circuitry for receiving a voltage wave via single wire 16 and generating a corresponding output bit stream. First die 12 can include, for example, high voltage circuits which are implemented using older technology nodes (e.g. using larger devices), while second die 14 can include, for example, low voltage circuits implemented using newer technology nodes (e.g. using smaller devices) which perform higher-end computations. Die 14 may also include medium voltage circuits, such as, for example, for creating I/O functions. In one embodiment, die 14 includes medium and low voltage digital circuitry and may be referred to as the compute die, and die 12 includes high voltage analog circuitry and may be referred to as the companion die or the analog die.

In one embodiment, die 12 and die 14 each receives a first supply voltage, VDDIO (e.g. 1.5V), which may be used by interfaces 6 and 8. The value of VDDIO is selected such that it does not damage the medium voltage (MV) devices of die 14. In the illustrated embodiment, die 14 also receives a second (e.g. low) supply voltage VDDLV (e.g. 0.75V) which may be used for the low voltage (LV) devices. Signals within die 14 may be level shifted between VDDLV and VDDIO, as needed. Any LV device within the digital circuitry of die 14 can be damaged when a voltage of greater than VDDLV (or "VDDLV+a margin") is applied to any two terminals of the LV device. Similarly, any MV device can be damaged when a voltage of greater than VDDIO (or "VDDIO+a margin") is applied to any two terminals of the MV device. In the illustrated embodiment, die 12 also receives a third (e.g. high) supply voltage VDDHV (e.g. 3V or 5V) which may be used for the high voltage (HV) devices. Signals within die 12 may be level shifted between VDDHV and VDDIO, as needed. The HV devices within the analog circuit of die 12 are capable of handling the higher supply voltage. In alternate embodiments, both of die 12 and 14 may include LV devices and operate with the low voltage levels (in which VDDIO may be the same as VDDLV). The values of VDDIO, VDDHV, and VDDLV are only provided as examples, and alternate embodiments may use different voltage values in which VDDHV≥VDDIO≥VDDLV. Although not labeled in FIG. 1, each of die 12 and die 14 also receives a fourth supply voltage, VSS, which is less than each of VDDIO and VDDLV. For example, VSS may be ground or 0V. Note that, as used herein, the voltage supply terminals which receive the corresponding supply voltage may just be referred to by the supply voltage itself (e.g. VDDIO, VDDHV, VDDLV, and VSS).

In the illustrated embodiment, both die 12 and die 14 are included in a same package 18, in which package 18 may be referred to as a system in a package (SIP). In an alternate embodiment, die 12 and die 14 can instead both be implemented as separate packages on a printed circuit board (PCB) in which reference numeral 18 may instead refer to the PCB. Note that in alternate embodiments, package 18 (or the PCB) can include more than just two die. For example, additional die may be included, such as, for example, a memory.

Figure 2:
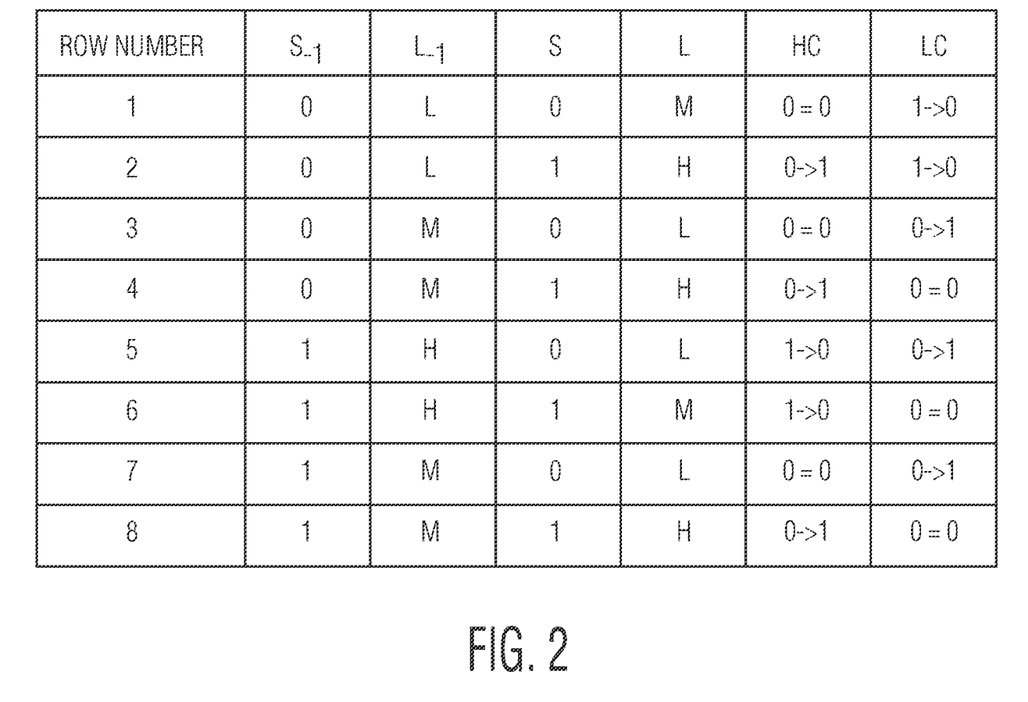
FIG. 2 illustrates, in table form, state and level values of a single-wire interface communication protocol, in accordance with one embodiment of the present invention

FIG. 2 illustrates, in table form, example values to illustrate operation of the single communication protocol, in accordance with one embodiment of the present invention. An input voltage (Vin) is categorized into one of three voltage levels: high (H), mid (M), and low (L). Each voltage level (Lv) of H, M, and L corresponds to a particular voltage range such that when Vin is greater than a high voltage threshold (Vrh), Vin>Vrh, Vin is categorized as H, when less than a low voltage threshold (Vrl), Vin<Vrl, Vin is categorized as L, and when neither greater than Vrh nor less than Vrl, Vrh≥Vin≥Vrl, Vin is categorized as M. From the level information of the current bit and the previous bit, the corresponding logic value, i.e. state(S), of the current bit can be determined. As will be described in reference to the table of FIG. 2, when the level is H, the corresponding state is one (e.g. when Lv=H then S=1), when the level is L, the corresponding state is zero (e.g. when Lv=L then S=0). Therefore, when Lv is H or L, no additional information from a previous bit is needed to determine the state of the current bit. However, when the level is M, the corresponding state(S) of the current bit is the same as the immediately previous state. That is, when the level is M, the corresponding state depends on the previous level ($Lv_{-1}$)/previous state ($S_{-1}$). (Note that in alternate embodiments, the logic values can be flipped such that when Lv=H, S=0 and when Lv=L, S=1.)

Figure 3:
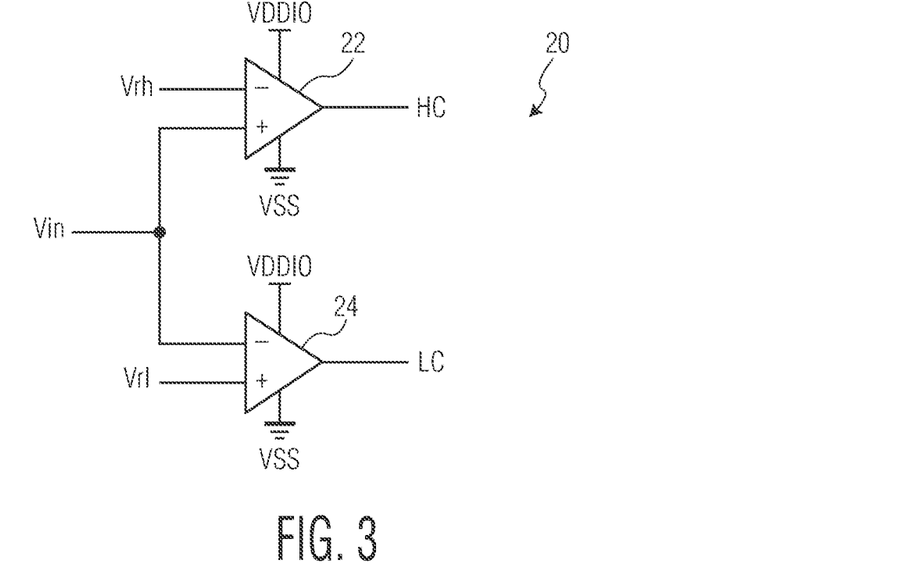
FIG. 3 illustrates, in block diagram form, a portion of receiver in accordance with one embodiment of the present invention.

FIG. 3 illustrates a comparator portion 20 of a receiver circuit which includes comparators 22 and 24. Comparators 22 and 24 are configured to provide outputs HC and LC, respectively. Each of the comparators is coupled between a pair of voltage supply terminals (coupled to receive VDDIO and VSS, respectively). An inverting input of comparator 22 is coupled to receive Vrh, a non-inverting input of comparator 22 is coupled to receive Vin, and an output of comparator 22 provides an output HC which is asserted (e.g. at a logic level one) when Vin>Vrh, and negated (e.g. at a logic level zero) otherwise. An inverting input of comparator 24 is coupled to receive Vin, a non-inverting input of comparator 24 is coupled to receive Vrl, and an output of comparator 24 provides an output LC which is asserted (e.g. at a logic level one) when Vin≤Vrl, and negated (e.g. at a logic level zero) otherwise. In one embodiment, Vrh=⅔ of VDDIO and Vrl=⅓ of VDDIO, and a middle reference voltage, Vmid, is VDDIO/2. However, alternate embodiments may use different fractions of VDDIO for Vrh and Vrl, so long as Vrh>Vmid>Vrl. The outputs HC and LC indicate the level of Vin. For example, if HC=1 (indicating Vin>Vrh) and LC=0, then Lv=H. If LC=1 (indicating Vin<Vrl) and HC=0, then Lv=L. If HC=0 and LC=0 (indicating Vrh≥Vin≥Vrl), then Lv=M. Therefore, note that comparator circuit 20 may also be referred to as a voltage level determination circuit.

Referring back to the table of FIG. 2, the first column provides the row number for each row of the table, the second column (labeled $S_{-1}$) indicates the previous state, the third column (labeled $Lv_{-1}$) indicates the previous level, the fourth column (labeled S) indicates the current state, the fifth column (labeled Lv) indicates the current level, the sixth column indicates the value of HC, and the seventh column indicates the value of LC. The rows provide resulting S values based on values of HC, LC, and possibly $S_{-1}$, with edge transitions of at least one of HC or LC. For example, in the first row, when HC=0, and LC has transitioned from 1 to 0 such that both HC=0 and LC=0, Lv=M. In this case, S is set to $S_{-1}$ such that S=0 because with Lv=M, the value of S also depends on $S_{-1}$. Similarly, in the sixth row, LC=0 and HC has transitioned from a one to a zero such that LC=HC=0, Lv=M. Therefore, S is set to $S_{-1}$ such that S=1. Therefore, although both the first and sixth rows indicated Lv=M, the S value further depends on $S_{-1}$, in which in the former case, S=0, and the latter case, S=1.

In the second row, when HC has transitioned from 0 to 1 and LC has transitioned from 1 to 0, such that HC=1 and LC=0, Lv=H and therefore S=1. In the fifth row, when HC has transitioned from 1 to 0 and LC from 0 to 1, such that HC=0 and LC=1, Lv=L and therefore S=0. Note that in these rows, there are two transitions in that HC and LC both transitioned.

In the third row, when HC=0 and LC has transitioned from 0 to 1 such that HC=0 and LC=1, Lv=L and therefore S=0. Similarly, in the seventh row, when HC=0 and LC has transitioned from 0 to 1 such that HC=0 and LC=1, Lv=L and therefore S=0. Therefore, S=0 in both cases even though $S_{-1}$ had different values. In the fourth row, when LC=0 and HC has transitioned from 0 to 1, Lv=H and therefore S=1. Similarly, in the eighth row, when LC=0 and HC has transitioned from 0 to 1, Lv=H and therefore S=1. Therefore, S=1 in both cases even though $S_{-1}$ had different values.

In all rows except the first and sixth rows, the values of HC and LC indicate Lv=H or Lv=L, in which Lv alone can be used to indicate S (e.g. S=1 if Lv=H and S=0 if Lv=L). That is, $S_{-1}$ is not necessary in determining S. However, in the first and sixth rows in which Lv=M, S cannot be determined just based on Lv=M, but is determined based also on $S_{-1}$. Note also that each row of the table indicates a value of S indicated by a transition (e.g. either a failing edge or rising edge) of at least one of HC or LC. In all rows except the second and fifth row, the value of S is indicated by a transition in only one of HC or LC. However, in the second and fifth rows, the value of S is indicated by a transition in both of HC and LC.

Figure 4:
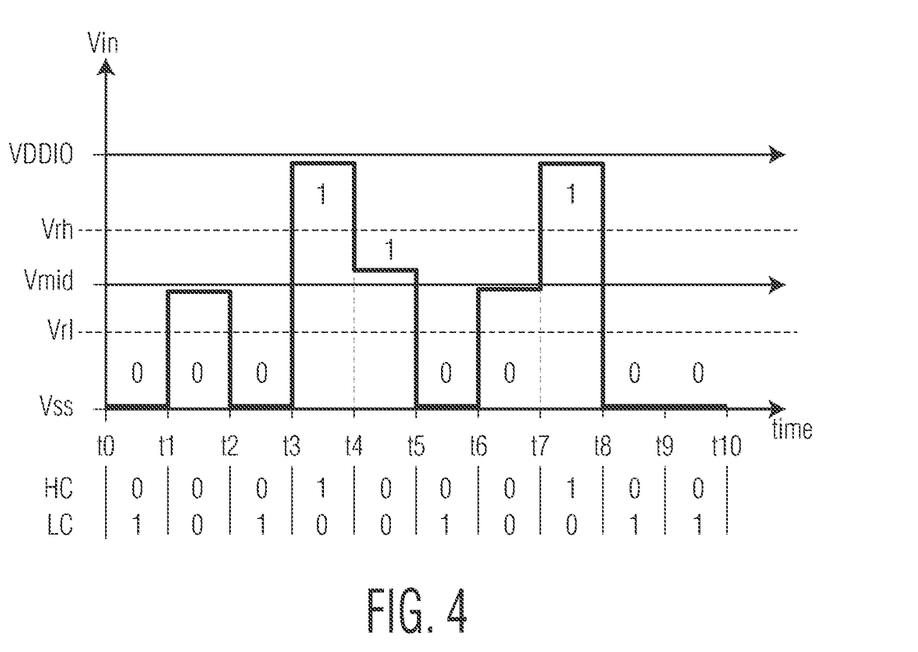
FIG. 4 illustrates a waveform with an input voltage wave and a corresponding output bit stream, in accordance with one embodiment of the present invention.

FIG. 4 illustrates an example input voltage waveform for Vin and the corresponding n-bit output stream, in accordance with one embodiment of the present invention. The input Vin from time t0 to t9 generates a 9-bit output bit stream, S(n)=9'b000110010, labeled on the waveform itself. (The final "0" between time t9 and t10 is invalid and will be discussed in more detail below.) Note that, as used herein, the value following "'b" is a binary value in which the value preceding "'b" indicates the number of bits. Underneath the waveform, under each bit value (i.e. each S value) of the output bit stream, the corresponding values of HC and LC are provided. Note that for time t0 to t9, a bit of the output stream is generated with each transition of Vin from one voltage level to another voltage level, i.e. with each transition of at least one of LC or HC. Further, a valid bit must correspond to a transition of at least one of LC or HC.

As illustrated in FIG. 4, Vin varies between VSS and VDDIO. When Vin is less than Vrl, LC=1, HC=0, and S=0, as seen in time intervals t0-t1, t2-t3, t5-t6, and t8-t9, following changes in Lv at times t0, t2, t5, and t8, respectively.

(It is assumed that prior to t0, Lv of Vin was either H or M). When Vin is greater than Vrh, HC=1, LC=0, and S=1, as seen in time intervals t3-t4 and t7-t8, following changes in Lv at times t3 and t7, respectively. When Vin is between Vrh and Vrl, HC=LC=0 and S=S$_{-1}$. For example, at time t1, following a change in Lv from L to M (resulting in a falling edge of LC), S remains 0 because S$_{-1}$=0 (in immediately prior interval t0-t1). As another example, at time t4, following a change in Lv from H to M (resulting in a falling edge of HC), S remains 1 because S$_{-1}$=1 (in immediately prior interval t3-t4). As an other example, at time t6, following a change in Lv from L to M (resulting in a falling edge of LC), S remains 0 because S$_{-1}$=0 (in immediately prior interval t5-t6).

Therefore, a bit of the output bit stream is generated each time at least one of HC or LC transitions (i.e. switches). In this manner, the input waveform can be transmitted without a corresponding clock signal. Also, in one embodiment, when a transition in at least one of HC or LC has not occurred within a predetermined amount of time (e.g. corresponding to a maximum time duration of a single bit in accordance with the communication bit rate), a protocol violation is indicated. However, the bandwidth is not overly affected because since a bit is received with each transition of at least one of HC or LC, the communication can be quickly recovered. Therefore, the single wire protocol, in addition to the bit values, also provides both timing and valid information.

In one embodiment, protocol violations can be used to provide additional functionality. For example, in FIG. 4, the final bit in the bit stream at time t8 extends through time t9 to time t10. In this case, this final "0" bit is a protocol violation because no transition of HC or LC occurred at time t9. If a subsequent 0 were desired in the bit stream at t9, following the 0 at time t8, the waveform would need to transition from Lv=L to Lv=M. In one embodiment, if the voltage remains at Lv=L too long (e.g. greater than a maximum duration of a single bit, as illustrated at the end of the bit stream in FIG. 4), this could be used to indicate additional operations, such as a "reset and resync" command. In one embodiment, if the voltage remains at Lv=H or at Lv=M too long (e.g. greater than a maximum bit duration), different information or commands can be indicated. For example, in the former case with Lv=H, an end of frame can be indicated, and with the latter case with Lv=M, a start of frame can be indicated.

Figure 5:
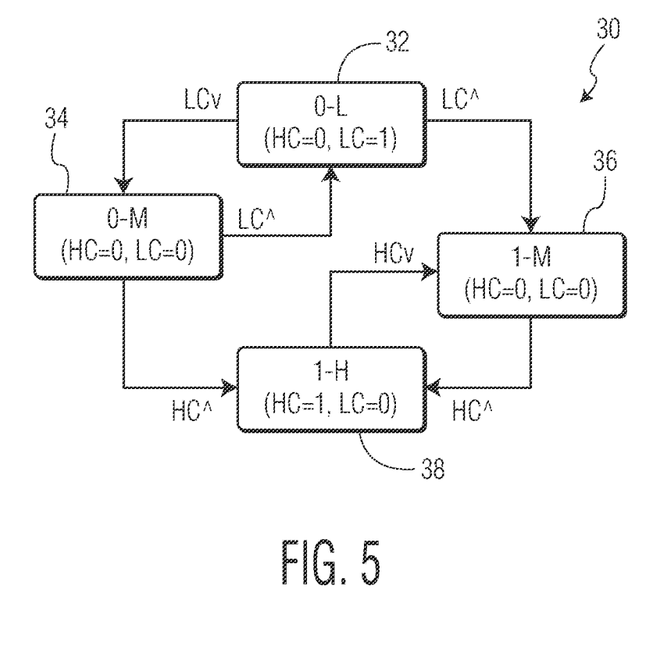
FIG. 5 illustrates a state diagram for receiving an input voltage wave and generating a corresponding output bit stream, in accordance with one embodiment of the present invention.

FIG. 5 illustrates a state machine (SM) 30 which can be implemented by a receiver to receive an input wave and generate a corresponding output bit stream, in accordance with one embodiment of the present invention. SM 30 includes four SM states: "0-L" 32 corresponding to S=0 with Lv=L, "0-M" 34 corresponding to S=0 with Lv=M, "1-H" 38 corresponding to S=1 with Lv=H, and "1-M" 36 corresponding to S=1 with Lv=M. Transitions between SM states are based on transitions of LC and HC in which LCv and HCv denote falling edges of LC and HC, respectively, and LC^ and HC^ denote rising edges of LC and HC, respectively. Therefore, note that, as described above, with each transition of LC or HC, SM 30 transitions to a different SM state, corresponding to S=0 or S=1. Note that, as used herein, "SM state" refers to a states of SM 30, and "S" refers to a state or bit value of the output bit stream.

For example, referring to FIGS. 4 and 5 together, at time t0, with HC=0 and LC=1, SM 30 is in SM state "0-L" such that Lv=L and S=0. At time t1, LC transitions from 1 to 0, resulting in a falling edge of LC. Therefore, SM 30 follows the arrow labeled LCv, transitioning to SM state "0-M," with Lv=M in which HC=LC=0, and S=0 (since S was 0 in previous SM state 32, meaning S$_{-1}$=0). Once in SM state "0-M," either a rising edge of LC (resulting in Lv=L) or a rising edge of HC (resulting in Lv=H) causes SM 30 to transition to a next SM state. Therefore, continuing with the example of FIG. 4, at time t2, LC switches back to 1, resulting in a rising edge of LC. Therefore, SM follows the arrow labeled LC^ back to SM state "0-L." If, instead, while in SM state "0-M," HC transitions to 1 resulting in a rising edge of HC, SM 30 transitions to SM state "1-H" with Lv=H in which HC=1 and LC=0 such that S=1. This transition occurs, for example, at time t7 of FIG. 4.

Similar to SM states 32 and 34, when SM 30 is in SM state "1-H" with Lv=H in which HC=1 and LC=0, in response to a falling edge of HC, SM 30 follows the arrow labeled HCv, transitioning to SM state "1-M" (as seen at time t4 of FIG. 4). In this SM state, Lv=M in which HC=LC=0, and S=1 (since S was 1 in previous SM State 38, meaning S$_{-1}$=1). This is in contrast to SM state "0-M" in which Lv=M but S=0. Once in SM state "1-M", a rising edge of HC results in SM 30 transitioning to SM state "1-H," while a rising edge of LC results in SM transitioning back to SM State "0-L."

For any transition in which only one of HC or LC switches, SM 30 transitions once from one SM state to another. However, when both HC and LC switch, such as when transitioning from S=0 to S=1 or from S=1 to S=0, SM 30 transitions through SM state "0-M" or SM state "1-M" as transient states before transitioning to a final state. For example, at time t3 of FIG. 4, SM 30 is in SM state "0-L" (prior to time t3) and upon a rising edge on HC and a falling edge on LC at time t3, SM transitions twice, first to SM state "0-M" due to LCv and then continues on to SM state "1-H" due to HC^. Therefore, at time t3, with HC=1, Lv=H and S=1. Similarly, at time t8 of FIG. 4, SM 30 is in SM State "1-H" (prior to time t8) and upon a falling edge on HC and rising edge on LC, SM transitions first to SM state "1-M" due to HCv and then continues on to SM State "0-L" due to LC^.

Therefore, a receiver capable of receiving an input voltage waveform, as illustrated in 4, and generating the corresponding output bit stream (e.g. generate the values of S) can be located in any die which receives communication via a single wire using the single wire protocol described above. For example, the receiver can be any circuitry which implements the functionality represented by the table of FIG. 2 or the functionality of SM 30 Similarly, a transmitter capable of generating a voltage waveform, such as the voltage waveform of FIG. 4, can be located in any die which transmits communication via a single wire using the single wire protocol described above. In one embodiment, each die which implements the single wire communication protocol includes both a receiver and a transmitter to generate waveforms and receive waveforms in accordance with the communication protocol.

With respect to the embodiment of FIG. 1, a transmitter within interface circuitry 6 can generate a voltage waveform on wire 16 which varies between 0 and VDDIO (e.g. 1.5V), and a receiver within interface circuitry 8 is capable of receiving a voltage on wire 16 which varies between 0 and VDDIO (e.g. 1.5V). Therefore, each of the receiver and transmitter within a die can receive or transmit a voltage waveform in accordance with its voltage capabilities. Typically, each die would include both a transmitter and a receiver to be able to fully communicate with another die via a single wire.

Figure 6:
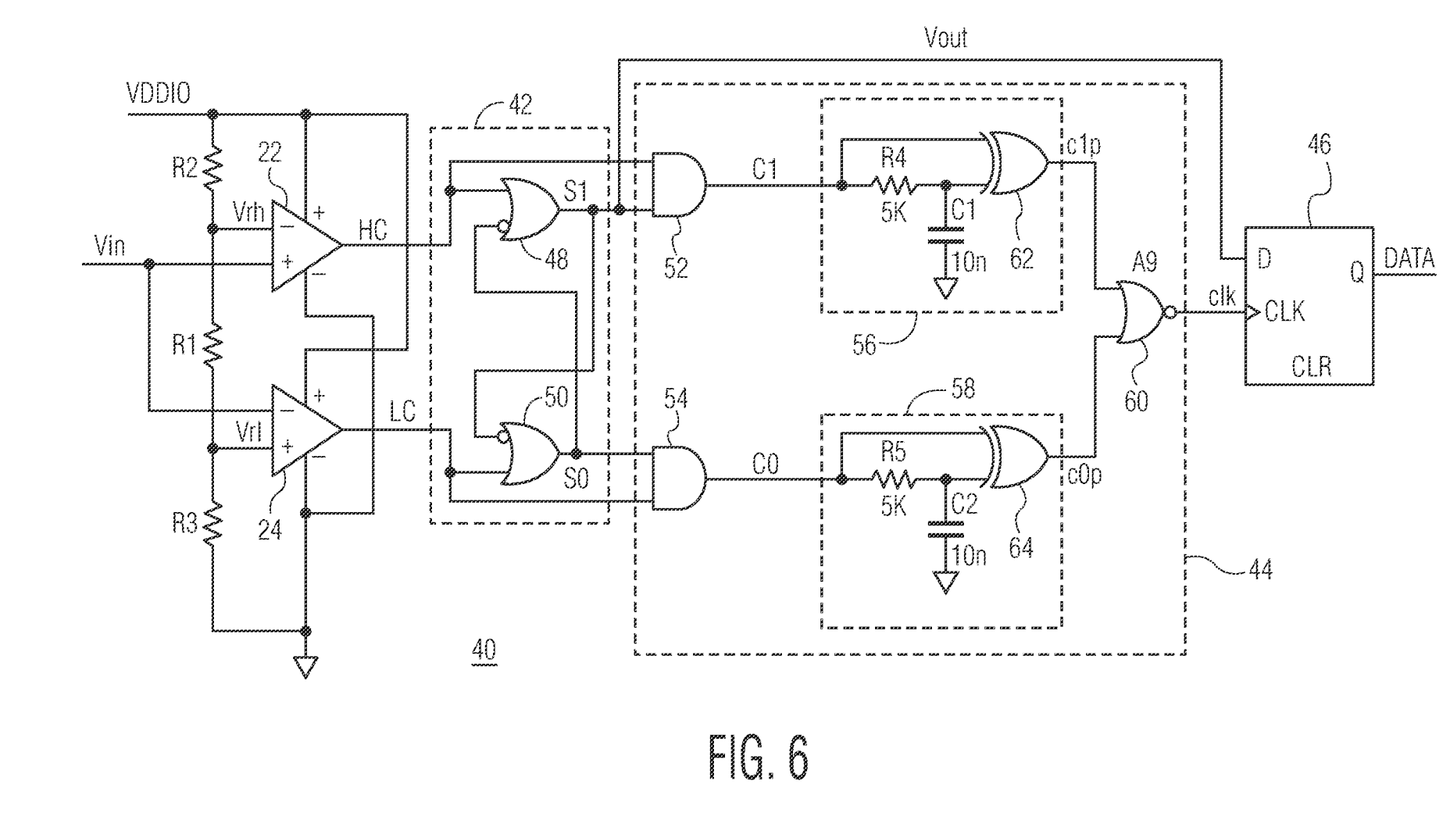
FIG. 6 illustrates, in partial schematic and partial block diagram form, a receiver in accordance with one embodiment of the present invention.

FIG. 6 illustrates, in block diagram form, a receiver circuit 40 (also referred to as receiver), in accordance with one embodiment of the present invention, which receives an input waveform (e.g. Vin) and generates an output bit stream corresponding to the input waveform. Receiver 40 includes comparator portion 20 which receives Vin and generates HC and LC as described above in reference to FIG. 3. A first resistor R1 is coupled between the inverting input of comparator 22 and the non-inverting input of comparator 24, a second resistor R2 is coupled between the supply terminal which supplies VDDIO and the inverting input of comparator 22, and a third resistor R3 is coupled between the non-inverting input of comparator 24 and the supply terminal which supplies VSS. Each of R1, R2, and R3 have a same resistance value (e.g. 1 kOhm) such that Vrh=⅔ (VDDIO) and Vrl=⅓ (VDDIO). Receiver 40 includes a Set-Reset (SR) flip flop 42 which is coupled to receive HC at a first input, e.g. a Set (S) input, and LC at a second input, e.g. a Reset (R) input). When HC at the first input is asserted to a logic level one, a first output (S1) of SR flip flop 42 is asserted to a logic level one. When LC at the second input is asserted to a logic level one, a second output (S0) of SR flip flop 42 is asserted to a logic level one. The outputs S1 and S0 are provided to an internal clock generator 44 to generate a clock signal, clk. Receiver 40 includes a D flip flop 46 coupled to receive the S1 output of SR flip flop 42 at a data (D) input and clk at a clock input, and provides a next bit value of DATA at output Q. Therefore, DATA at the output of flip flop 46 corresponds to the output bit stream generated from Vin.

SR flip flop 42 includes OR gates 48 and 50. OR gate 48 has a first input (corresponding to the S input of SR flip flop 42) coupled to receive HC and a second input coupled to receive an inverted version (as indicated by a circle) of an output of OR gate 50. OR gate 50 has a first input coupled to receive an inverted version (as indicated by a circle) of the output of OR gate 48, and a second input (corresponding to the R input of SR flip flop 42) coupled to receive LC. In the illustrated embodiment, the output of OR gate 48 corresponds to the output of SR flip flop 42 which provides the output voltage (Vout) to the D input of D flip flop 46, such that when the CLK input is asserted, the value at the D input is provided as the next bit of the output data stream.

In operation, only one of HC or LC can be asserted at any given time. Therefore, while HC is asserted to a logic level one (Vin is at Lv=H), LC is negated to zero, and while LC is asserted to a logic level one (Vin is at Lv=L), HC is negated to zero. (Note that in this description, logic level one and logic level zero may simply be referred to as one and zero, respectively, or as logic level high and logic level low, respectively.) When HC is asserted to a logic level one, the output of OR gate 48, and thus the S1 output, is asserted to a logic level one. With the output of OR gate 48 (and thus Vout) being asserted, the next bit (i.e. bit value) of the output stream is provided as S=1. Also, with the output of OR gate 48 being a logic level one, the first input to OR gate 50 is a zero (i.e. the inverted version of the output of OR gate 48). In this case, LC is negated to a logic level zero, such that the output of OR gate 50 is zero.

However, when HC is negated to zero (due to Vin changing to Lv=M or Lv=L), the output of OR gate 48 does not change immediately (remaining a one) because the inverted version of the output of OR gate 50 is still a one. In this manner, the output of OR gate 48 (which provides Vout at the D input of flip flop 46) still maintains the previous value (corresponding to Lv=H) until the output of OR gate 50 changes. Therefore, in the case that HC was negated to zero due to Vin changing to Lv=M, Vout is maintained at the same value, i.e. a logic level one, which results in providing the next bit (i.e. bit value) of the output stream as the same value as the previous value (S=S₋₁=1).

However, in the case that HC was negated to zero due to Vin changing directly to Lv=L, then LC is also asserted to a logic level one. (That is, both HC and LC transition in this case.) When LC asserted to a logic level one, the output of OR gate 50, and thus the S0 output, is asserted to a logic level one. Also, in this case, with the output of OR gate 50 being a logic level one, the second input to OR gate 48 becomes a zero. This results in the output of OR gate 48 (and thus Vout) being negated to zero (to provide the next bit of the output stream as S=0).

Similarly, when LC is negated to a logic level zero (due to Vin changing to Lv=M or Lv=H), the output of OR gate 50 remains a one because the output of OR gate 48 remains a zero. In this manner, the output of OR gate 48 still maintains the previous value (corresponding to Lv=L). Therefore, in the case that LC was negated to zero due to Vin changing to Lv=M (in which HC also remains negated to zero), Vout is maintained at the same value, i.e. a zero, which results in providing the next bit (i.e. bit value) of the output stream as the same value as the previous value (S=0). However, in the case that LC was negated due to Vin changing directly to Lv=H, then HC is also asserted to a logic level one. (That is, both HC and LC transition in this case.) As described above, the output of OR gate 48 is asserted to a logic level one, and the next bit (i.e. bit value) of the output stream is provided as S=1.

Internal clock generator 44 (also referred to simply as clock generator) provides a pulse on the CLK input of D flip flop 46 to properly capture the Vout (provided by the output of OR gate 48) in response to a transition of at least one of HC or LC and thus provide the next bit value (S=0 or 1) of the output bit stream. Internal clock generator 44 provides this internal clock pulse based on the received Vin, generated outputs HC and LC (by comparator portion 20), and generated outputs S0 and S1 (by SR flip flop 42) and therefore does not receive any external clock signal to control this internal clock pulse at CLK. Clock generator 44 includes AND gates 52 and 54 and edge detector circuits 56 and 58. AND gate 52 has a first input coupled to receive HC, a second input coupled to the output of OR gate 48 (corresponding to the S1 output from SR flip flop 42), and an output coupled to provide C1. AND gate 54 has a first input coupled to receive the output of OR gate 50 (corresponding to the S0 output of SR flip flop 42), a second input coupled to receive LC, and an output coupled to provide C0. Therefore, when HC is asserted, C1 is asserted to a logic level one once this asserted value of HC propagates through OR gate 48 to the S1 output, and similarly, when LC is asserted, C0 is asserted to a logic level one once this asserted value of LC propagates through OR gate 50 to the S0 output.

Edge detector circuit 56 is coupled to the output of AND gate 52 to receive C1 and provides this value to a first input of an XOR gate 62 and a delayed version of this value via an RC filter to a second input of XOR gate 62. Therefore, the output of XOR gate 62 provides a pulse at its output when the output of AND gate 52 is asserted to a logic level one, in which the time duration of the pulse is determined by the RC time constant of the RC filter at the second input of XOR gate 62. Similarly, edge detector circuit 58 is coupled to the output of AND gate 54 to receive C0 and provides this value to a first input of an XOR gate 64 and a delayed version of this value via an RC filter to a second input of XOR gate 64. Therefore, the output of XOR gate 64 provides a pulse at its output when the output of AND gate 54 is asserted to a logic level one, in which the time duration of the pulse is determined by the RC time constant of the RC filter at the second input of XOR gate 64.

These pulses at the outputs of XOR gates 62 and 64 are provided to NOR gate 60 which generates an edge with a short pulse at the CLK input between with each transition of Vin between levels L, M, and H. That is, the transition of Vin between levels results in switching of either HC or LC, or of both HC and LC, which results in switching of the first and second outputs of SR flip flop 42 (which then results in switching the outputs of AND gates 52 and 54). With NOR gate 60, the short amount of time between switches in HC or LC correspond to a pulse on CLK which captures Vout and generates the next bit of the output data stream at each edge of Vin (i.e. at each Lv transition of Vin). The duration of the pulses at CLK can be adjusted by adjusting, for example, the time constant with the RC filters.

Note that SR flip flop 42 and D flip flop 46 can be referred to as a bit value generator of receiver 40, which generates a next bit value of the output bit stream based at least on outputs of comparator portion 20. When comparator portion 20 indicates that the input voltage is at level M, though, the bit value generator generates the next bit value based on an immediately previous bit value of the output bit stream. In one embodiment, the next bit value is generated based on timing provided by internal clock generator 44.

Figure 7:
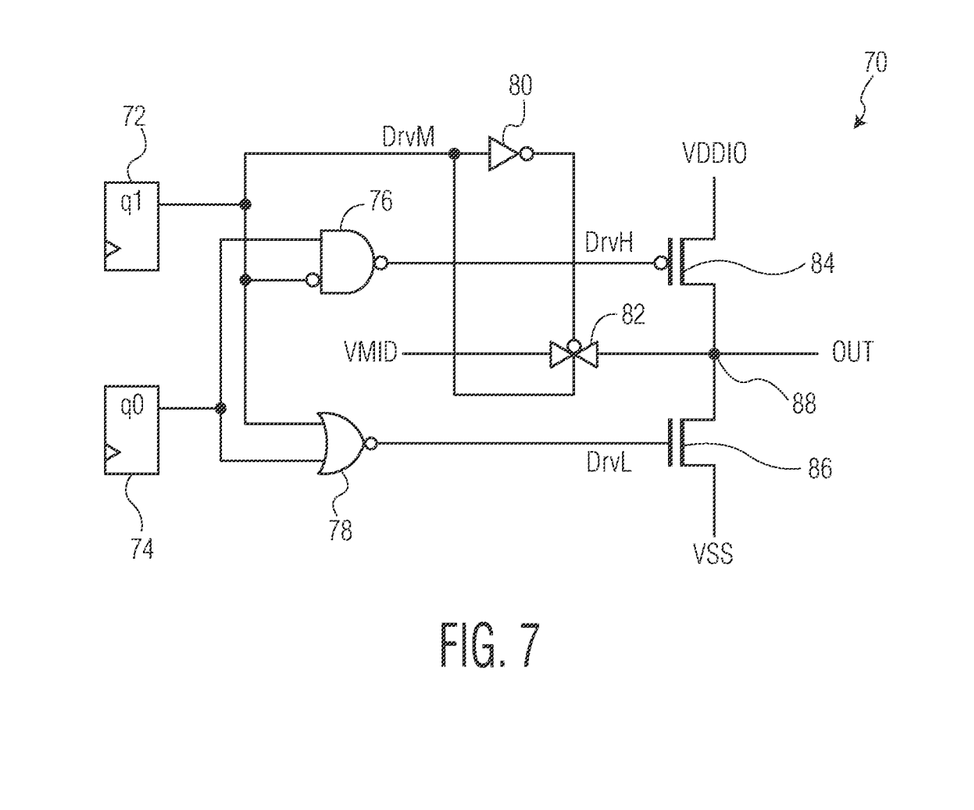
FIG. 7 illustrates, in partial schematic and partial block diagram form, a transmitter in accordance with one embodiment of the present invention.

Note that in alternate embodiments, a receiver can be implemented with different circuitry than as illustrated in FIG. 6. In one embodiment, rather than use the output of OR gate 48 as Vout, a different node of SR flip flop 52, such as the output of OR gate 50, can be used to provide Vout. In other alternate embodiments, the functionality of the level detection circuit performed by receiver portion 20 or of SR flip flop 42, or of internal clock generator 44 can be performed using a different combination of circuit elements or with a different circuit design. Note that, in some embodiments, additional actions can be performed after decoding the bit stream from a received voltage waveform, such as error detection and correction at the symbol level FIG. 7 illustrates, in partial schematic and partial block diagram form, a transmitter 70 in accordance with one embodiment of the present invention, which receives a bit stream and generates a voltage wave form corresponding to the bit stream. Transmitter 70 includes latches 74 and 72 which provide the values q0 and q1, respectively. Transmitter 70 includes NAND gate 76, NOR gate 78, inverter 80, transmission gate 82, a p-type transistors 84 and an n-type transistor. Latch 74 is coupled to provide q0 to a first input of NAND gate 76. Latch 72 is coupled to provide an inverted version of q1 (as indicated by the circle) to a second input of NAND gate 76. Latch 72 is also coupled to provide q1 to an input of inverter 80, to a first control input of transmission gate 82, and to a first input of NOR gate 78. Latch 74 is coupled to provide q0 to a second input of NOR gate 78. An output of inverter 80 is coupled to a second control input of transmission gate 82, in which the second control input receives the inverse of the first control input. An output of NAND gate 76 is coupled to a control electrode of p-type transistor 84, and an output of NOR gate 78 is coupled to a control electrode of n-type transistor 86. A first current electrode of transistor 84 is coupled to receive the first supply voltage VDDIO, and a second current electrode of transistor 84 is coupled to a circuit node 88, which provides an output, OUT, of transmitter 70. A first current electrode of transistor 86 is coupled to node 88, and a second current electrode of transistor 86 is coupled to the third supply voltage, VSS. An input terminal of transmission gate 82 is coupled to receive Vmid, and an output terminal of transmission gate 82 is coupled to node 88. The output OUT corresponds provide a voltage waveform which implements the single-wire communication protocol. For example, a transmitter such as transmitter 70 in one die can be used to provide Vin to a receiver in another die.

In operation, the values of q0 and q1 can be set based on a next bit in the bit stream to be encoded so as to output the desired voltage level. For example, if the current level is L and the next bit to encode is a zero, the next level to be provided is M, but if the next bit to encode is a one, the next level to be provided is H. If the current level is M and the next bit to encode is zero, the next level to be provided is L, but if the next bit to encode is one, the next level is H. If the current level is H and the next bit to encode is a one, the next level to be provided is M, but if the next bit to encode is zero, the next level is L. Therefore, the values of q0 and q1 can be set as desired to provide the desired voltage level (Lv=H, M, or L).

For example, to provide Lv=L, the state of q190 is set to 2'b00 (in which the first "2" indicates a two-bit value, and the "'b" indicates the value which follows is in binary form), and to provide Lv=L, the estate of q190 is set to 2'b01. Therefore, in the case of Lv=L, with q1=q0=0, the output of NOR gate 78 is a one, which turns on transistor 86, and the output of NAND gate 76 is a one, which turns off transistor 84. This results in pulling OUT to VSS (e.g. to 0V). In the case of Lv=H, with q0=1 and q1=0, the output of NAND gate 76 is zero, which turns on transistor 84, and the output of NOR gate 78 is zero, which turns off transistor 86. This results in pulling OUT to VDDIO (e.g. the higher supply voltage available to the transmitter, e.g. 3.3V or 1.8V). With q1=0 with either Lv=L or Lv=H, note that transmission gate 82 is off.

To provide Lv=M, the state of q190 is set to 2'b1X, in which q1=1, and the value of q0 is a don't care and can therefore be either 1 or 0. In this manner, with q1=1, the output of AND gate 76 is one, turning off transistor 84 and the output of NOR gate 78 is zero, turning off transistor 86. Also, transmission gate 82 is turned on to provide Vmid to node 88. This is the case regardless of whether q0=0 or 1. Therefore, in this case, Vout is provided as Vmid.

Note that in alternate embodiments, a transmitter can be implemented with different circuitry than the circuitry illustrated in FIG. 7.

By now it should be appreciated that there has been provided a single-wire communication protocol for use in die to die communication. The single wire protocol utilizes three voltage levels (L, M, and H) to communicate bits on the single wire, in which a bit of data is communicated with each transition between the three voltage levels. In this manner, the protocol is implemented without using a separate wire for transferring any clock information. Instead, within a receiver, an internal clock or timing can be derived from the transitions between voltage levels as detected, for example, by a set of comparators. For example, comparators can be used to indicate whether or not an input voltage level is less than a low voltage threshold (Vrl) or greater than a high voltage threshold (Vrh). In the case that the input voltage is less than Vrh, the corresponding state of the bit a first logic level (e.g. 0), and in the case it is greater than Vrh, the corresponding state of the bit is a second logic level (e.g. 1), opposite the first logic level. However, if the input voltage is between the high and low voltage thresholds (neither greater than Vrh nor less than Vrl), the corresponding state of the bit depends on the state of the previous bit.

This allows for fast communication (i.e. full bandwidth communication) with easy clock recovery, if needed. In one embodiment, immediately successive bits which have the same voltage level indicate a violation of the protocol, in which protocol violations may be used to communicate additional information.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Therefore, a logic level one and a logic level zero may be considered opposite logic states or values.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the receivers and transmitter can be implemented using different circuit designs. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In an embodiment, a system includes a receiver circuit configured to receive an input voltage waveform from a single wire and configured to generate an output bit stream corresponding to the input voltage waveform. The receiver includes a voltage level determination circuit configured to indicate whether a voltage level of the input voltage waveform has one of a high level that is higher than a high voltage threshold, a low level that is lower than a low voltage threshold, or a mid level that is between the high and low voltage levels, wherein the high voltage threshold is greater than the low voltage threshold; and a bit value generator configured to provide a next bit value of the output bit stream as a first value when the voltage level is the high level, as a second value when the voltage level is the low level, and as a same value as an immediately previous bit value of the output bit stream when the voltage level is the mid level, wherein the first value and the second value correspond to opposite logic states. In one aspect, the bit value generator is configured to, when the voltage level is indicated as one of the high level or the low level, provide the next bit value based on the voltage level, and, when the voltage level is indicated as the mid level, provide the next bit value based on the voltage level and the immediately previous bit value. In another aspect, the voltage determination circuit includes a first comparator configured to assert a first output when a voltage of the input voltage waveform is greater than the high voltage threshold and negated otherwise; and a second comparator configured to assert a second output when the voltage of the input voltage waveform is less than the low voltage threshold and negated otherwise. In a further aspect, the voltage level determination circuit is configured to determine the voltage level as one of the high level, low level, or mid level based on the first output of the first comparator and the second output of the second comparator. In yet a further aspect, the bit value generator is configured to provide the next bit value of the output bit stream in response to each change in voltage level, wherein each change in voltage level is one of a change between the high and mid levels, a change between the low and mid levels, or a change between the high and low levels. In yet an even further aspect, each change in voltage level corresponds to at least one of the first output or the second output switching. In another aspect of the embodiment, the bit value generator is configured to provide the next bit value of the output bit stream in response to each change in voltage level, wherein each change in voltage level is one of a change between the high and mid levels, a change between the low and mid levels, or a change between the high and low levels. In another aspect, the system further includes a transmitter circuit configured to generate an output voltage waveform from a received a bit stream, wherein, for each bit value of the received bit stream, the transmitter generates an output voltage having the voltage level of one of the high level, the low level, or the mid level. In a further aspect, the transmitter circuit is further configured to, when the voltage level of the output voltage is currently at the low level, and the next bit value of the received bit stream is the second value, generate the output voltage having the voltage level at the mid level, and, when the voltage level of the output voltage is currently at the low level, and the next bit value of the received bit stream has the first value, generate the output voltage having the voltage level at the high level. In yet a further aspect, the transmitter circuit is further configured to, when voltage level of the output voltage is currently at the mid level, and the next bit value of the received bit stream is the second value, generate the output voltage having the voltage level at the low level, and, when the voltage level of the output voltage is currently at the mid level, and the next bit value of the received bit stream has the first value, generate the output voltage having the voltage level at the high level. In yet an even further aspect, the transmitter circuit is further configured to, when the voltage level of the output voltage is currently at the high level, and the next bit value of the received bit stream is the first value, generate the output voltage having the voltage level at the mid level, and, when the voltage level of the output voltage is currently at the high level, and the next bit value of the received bit stream has the second value, generate the output voltage having the voltage level at the low level. In another further aspect, the system includes a first die having the receiver; a second die having the transmitter, wherein the first die is connected to the second die via the single wire, wherein the transmitter is configured to transmit the output voltage waveform on the single wire. In a further aspect, the first die operates at higher voltages than the second die.

In another embodiment, a system includes a receiver circuit configured to receive an input voltage waveform from a single wire and configured to generate an output bit stream corresponding to the input voltage waveform. The receiver includes a comparison circuit configured to provide a first indicator to indicate whether or not a voltage level of the input voltage waveform is higher than a high voltage threshold and a second indicator to indicate whether or not the voltage level of the input voltage waveform is lower than a low voltage threshold, wherein the high voltage threshold is greater than the low voltage threshold; and a bit value generator configured to provide a next bit value of the output bit stream based on the first indicator and the second indicator, and, when the first indicator indicates the voltage level is not higher than the high voltage threshold and the second indicator indicates the voltage levels is not lower than the low voltage threshold, the next bit value is provided based further on an immediately previous bit value of the output bit stream. In one aspect of the another embodiment, the bit value generator is configured to provide the next bit value of the output bit stream in response to each switch of the comparison circuit, wherein a switch of the comparison circuit corresponds to a switch of at least one of the first indicator or the second indicator. In a further aspect, the receiver is configured to, when a duration of time from a first switch of the comparison circuit to an immediately subsequent switch of the comparison circuit is greater than a predetermined duration, a protocol violation is indicated.

In yet another embodiment, a method of generating an output bit stream from an input voltage waveform includes determining whether a voltage level of the input voltage waveform is at a high level that is greater than a high voltage threshold, at a low level that is less than a low voltage threshold, or at a mid level between the high and low voltage thresholds, wherein the high voltage threshold is higher than the low voltage threshold; when the voltage level is determined to be at the high level, generating a next bit value of the output bit stream as a first logic state; when the voltage level is determined to be at the low level, generating the next bit value as a second logic state, opposite the first logic state; and when the voltage level is determined to be at the mid level, generating the next bit value as a same value as an immediately previous bit value of the output bit stream. In one aspect of the yet another embodiment, the determining includes asserting a first indicator when the input voltage waveform is determined to be at the high level, and negating the first indicator otherwise; and asserting a second indicator when the input voltage waveform is determined to be at the low level, and negating the second indicator otherwise. In a further aspect, when the first and second indicators are both negated, the voltage level is determined to be at the mid level. In yet a further aspect, the next bit value of output bit stream is generated in response to a change in state of at least one of the first indicator or the second indicator.

What is claimed is:

1. A system comprising:
a receiver circuit configured to receive an input voltage waveform from a single wire and configured to generate an output bit stream corresponding to the input voltage waveform, the receiver comprising:
a voltage level determination circuit configured to indicate whether a voltage level of the input voltage waveform has one of a high level that is higher than a high voltage threshold, a low level that is lower than a low voltage threshold, or a mid level that is between the high and low voltage levels, wherein the high voltage threshold is greater than the low voltage threshold; and
a bit value generator configured to provide a next bit value of the output bit stream as a first value when the voltage level is the high level, as a second value when the voltage level is the low level, and as a same value as an immediately previous bit value of the output bit stream when the voltage level is the mid level, wherein the first value and the second value correspond to opposite logic states.

2. The system of claim 1, wherein the bit value generator is configured to:
when the voltage level is indicated as one of the high level or the low level, provide the next bit value based on the voltage level, and
when the voltage level is indicated as the mid level, provide the next bit value based on the voltage level and the immediately previous bit value.

3. The system of claim 1, wherein the voltage determination circuit comprises:
a first comparator configured to assert a first output when a voltage of the input voltage waveform is greater than the high voltage threshold and negated otherwise; and
a second comparator configured to assert a second output when the voltage of the input voltage waveform is less than the low voltage threshold and negated otherwise.

4. The system of claim 3, wherein the voltage level determination circuit is configured to determine the voltage level as one of the high level, low level, or mid level based on the first output of the first comparator and the second output of the second comparator.

5. The system of claim 4, wherein the bit value generator is configured to provide the next bit value of the output bit stream in response to each change in voltage level, wherein each change in voltage level is one of a change between the high and mid levels, a change between the low and mid levels, or a change between the high and low levels.

6. The system of claim 5, wherein each change in voltage level corresponds to at least one of the first output or the second output switching.

7. The system of claim 1, wherein the bit value generator is configured to provide the next bit value of the output bit stream in response to each change in voltage level, wherein each change in voltage level is one of a change between the high and mid levels, a change between the low and mid levels, or a change between the high and low levels.

8. The system of claim 1, further comprising:
a transmitter circuit configured to generate an output voltage waveform from a received a bit stream, wherein, for each bit value of the received bit stream, the transmitter generates an output voltage having the voltage level of one of the high level, the low level, or the mid level.

9. The system of claim 8, wherein the transmitter circuit is further configured to:
when the voltage level of the output voltage is currently at the low level, and the next bit value of the received bit stream is the second value, generate the output voltage having the voltage level at the mid level, and
when the voltage level of the output voltage is currently at the low level, and the next bit value of the received bit stream has the first value, generate the output voltage having the voltage level at the high level.

10. The system of claim 9, wherein the transmitter circuit is further configured to:
when voltage level of the output voltage is currently at the mid level, and the next bit value of the received bit stream is the second value, generate the output voltage having the voltage level at the low level, and
when the voltage level of the output voltage is currently at the mid level, and the next bit value of the received bit stream has the first value, generate the output voltage having the voltage level at the high level.

11. The system of claim 10, wherein the transmitter circuit is further configured to:
when the voltage level of the output voltage is currently at the high level, and the next bit value of the received bit stream is the first value, generate the output voltage having the voltage level at the mid level, and
when the voltage level of the output voltage is currently at the high level, and the next bit value of the received bit stream has the second value, generate the output voltage having the voltage level at the low level.

12. The system of claim 8, wherein the system comprises:
a first die having the receiver; and
a second die having the transmitter, wherein the first die is connected to the second die via the single wire, wherein the transmitter is configured to transmit the output voltage waveform on the single wire.

13. The system of claim 12, wherein the first die operates at higher voltages than the second die.

14. A system comprising:
a receiver circuit configured to receive an input voltage waveform from a single wire and configured to generate an output bit stream corresponding to the input voltage waveform, the receiver comprising:
a comparison circuit configured to provide a first indicator to indicate whether or not a voltage level of the input voltage waveform is higher than a high voltage threshold and a second indicator to indicate whether or not the voltage level of the input voltage waveform is lower than a low voltage threshold, wherein the high voltage threshold is greater than the low voltage threshold; and
a bit value generator configured to provide a next bit value of the output bit stream based on the first indicator and the second indicator, and, when the first indicator indicates the voltage level is not higher than the high voltage threshold and the second indicator indicates the voltage levels is not lower than the low voltage threshold, the next bit value is provided based further on an immediately previous bit value of the output bit stream.

15. The system of claim 14, wherein the bit value generator is configured to provide the next bit value of the output bit stream in response to each switch of the comparison circuit, wherein a switch of the comparison circuit corresponds to a switch of at least one of the first indicator or the second indicator.

16. The system of claim 15, wherein the receiver is configured to, when a duration of time from a first switch of the comparison circuit to an immediately subsequent switch of the comparison circuit is greater than a predetermined duration, a protocol violation is indicated.

17. A method of generating an output bit stream from an input voltage waveform, comprising:
determining whether a voltage level of the input voltage waveform is at a high level that is greater than a high voltage threshold, at a low level that is less than a low voltage threshold, or at a mid level between the high and low voltage thresholds, wherein the high voltage threshold is higher than the low voltage threshold;
when the voltage level is determined to be at the high level, generating a next bit value of the output bit stream as a first logic state;
when the voltage level is determined to be at the low level, generating the next bit value as a second logic state, opposite the first logic state; and when the voltage level is determined to be at the mid level, generating the next bit value as a same value as an immediately previous bit value of the output bit stream.

18. The method of claim 17, wherein the determining comprises:
asserting a first indicator when the input voltage waveform is determined to be at the high level, and negating the first indicator otherwise; and
asserting a second indicator when the input voltage waveform is determined to be at the low level, and negating the second indicator otherwise.

19. The method of claim 18, wherein when the first and second indicators are both negated, the voltage level is determined to be at the mid level.

20. The method of claim 19, wherein the next bit value of output bit stream is generated in response to a change in state of at least one of the first indicator or the second indicator.

* * * * *